(12) United States Patent
Takada et al.

(10) Patent No.: US 10,139,671 B2
(45) Date of Patent: Nov. 27, 2018

(54) POLARIZING PLATE WITH PRESSURE-SENSITIVE ADHESIVE LAYER

(71) Applicant: NITTO DENKO CORPORATION, Ibaraki-shi, Osaka (JP)

(72) Inventors: Katsunori Takada, Ibaraki (JP); Kota Nakai, Ibaraki (JP); Naotaka Higuchi, Ibaraki (JP); Shinobu Nagano, Ibaraki (JP); Eiko Suefusa, Ibaraki (JP); Yoshitsugu Kitamura, Ibaraki (JP); Youichirou Sugino, Ibaraki (JP); Keisuke Kimura, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 255 days.

(21) Appl. No.: 15/341,101

(22) Filed: Nov. 2, 2016

(65) Prior Publication Data

US 2017/0123266 A1    May 4, 2017

(30) Foreign Application Priority Data

Nov. 4, 2015 (JP) ................................. 2015-216369
Sep. 9, 2016 (JP) ................................. 2016-176171

(51) Int. Cl.
*G02F 1/1335* (2006.01)
*G02B 5/30* (2006.01)
(Continued)

(52) U.S. Cl.
CPC ........ *G02F 1/133528* (2013.01); *B32B 3/266* (2013.01); *B32B 7/12* (2013.01);
(Continued)

(58) Field of Classification Search
CPC ......... B29D 11/00644; G02F 1/133528; G02F 2001/133541; G02B 5/30; G02B 5/3025;
(Continued)

(56) References Cited

U.S. PATENT DOCUMENTS 8,817,373 B2    8/2014    Kobayashi et al.
2011/0019274 A1    1/2011    Kobayashi et al.

FOREIGN PATENT DOCUMENTS

EP    1 341 029 A2    3/2003
EP    1 341 029 A3    9/2003
(Continued)

OTHER PUBLICATIONS

Extended European Search Report dated Apr. 10, 2017, issued in counterpart European Application No. 16194792.4. (7 pages).

*Primary Examiner* — Carson Gross
(74) *Attorney, Agent, or Firm* — Westerman, Hattori, Daniels & Adrian, LLP (57) ABSTRACT

There is provided a polarizing plate which is imparted durability. A polarizing plats with a pressure-sensitive adhesive, layer according to an embodiment of the present invention includes: a polarizing plate including a polarizer and a protective film arranged on at least one side of the polarizer; and a pressure-sensitive adhesive layer formed on at least one surface of the polarizing plate, wherein in the surface of the polarizing plate where the pressure-sensitive adhesive layer is formed, a non-contact portion that is out of contact with the pressure-sensitive adhesive layer is formed in an end portion of the polarizing plate.

9 Claims, 3 Drawing Sheets

(51) Int. Cl.
    *B32B 3/26*          (2006.01)
    *B32B 7/12*          (2006.01)
    *B32B 37/12*        (2006.01)
    *B32B 37/14*        (2006.01)
    *B29D 11/00*        (2006.01)

(52) U.S. Cl.
    CPC .............. *B32B 37/12* (2013.01); *B32B 37/14* (2013.01); *G02B 5/305* (2013.01); *G02B 5/3033* (2013.01); *G02B 5/3041* (2013.01); *B29D 11/00644* (2013.01); *B32B 2307/42* (2013.01); *G02B 5/30* (2013.01); *G02B 5/3025* (2013.01); *G02F 2001/133541* (2013.01); *G02F 2202/28* (2013.01)

(58) Field of Classification Search
    CPC .... G02B 5/3033; G02B 5/3041; G02B 5/305; B32B 2307/42
    See application file for complete search history.

(56) References Cited

FOREIGN PATENT DOCUMENTS

| | | |
|---|---|---|
| JP | 2009-37228 A | 2/2009 |
| WO | 2013/114583 A9 | 8/2013 |

POLARIZING PLATE WITH PRESSURE-SENSITIVE ADHESIVE LAYER

BACKGROUND OF THE INVENTION

This application claims priority under 35 U.S.C Section 119 to Japanese Patent Application No. 2015-216369 filed on Nov. 4, 2015 and Japanese Patent Application No. 2016-176171 filed on Sep. 9, 2016 which are herein incorporated by reference.

1. Field of the Invention

The present invention relates to a polarizing plate with a pressure-sensitive adhesive layer.

2. Description of the Related Art

A polarizing plate has been used in an image display apparatus (e.g., a liquid crystal display apparatus) of a cellular phone, a notebook personal computer, or the like. In recent years, the use of the polarizing plate in, for example, a meter display portion of an automobile or a smart watch has been desired, and hence the formation of the polarizing plate into a shape except a rectangular shape and the formation of a through-hole in the polarizing plate have been desired. However, when any such form is adopted, a problem in terms of durability is liable to occur. For the purpose of improving the durability, for example, there has been proposed a polarizing plate having an outer peripheral end surface formed by melting layers and then solidifying the molten layers (see Japanese Patent Application Laid-open No. 2009-37228). However, a further improvement in durability has been required.

SUMMARY OF THE INVENTION

The present invention has been made to solve the problem, and a primary object of the present invention is to impart durability to a polarizing plate.

The inventors of the present invention have paid attention to a relationship between a polarizing plate and a pressure-sensitive adhesive layer configured to bond the polarizing plate, and have found that when a non-contact portion that is out of contact with the pressure-sensitive adhesive layer is formed in the bonding surface of the polarizing plate, a site on which a stress that may occur between the polarizing plate and the pressure-sensitive adhesive layer owing to a change in external environment concentrates is shifted, and hence the object can be achieved. Thus, the inventors have completed the present invention.

A polarizing plate with a pressure-sensitive adhesive layer according to an embodiment of the present invention includes: a polarizing plate including a polarizer and a protective film arranged on at least one side of the polarizer; and a pressure-sensitive adhesive layer formed on at least one surface of the polarizing plate, wherein in the surface of the polarizing plate where the pressure-sensitive adhesive layer is formed, a non-contact portion that is out of contact with the pressure-sensitive adhesive layer is formed in an end portion of the polarizing plate.

In one embodiment of the present invention, the non-contact portion is formed at a position distant from an end side of the polarizing plate by 10 μm or more inward in a plane direction.

In one embodiment of the present invention, the non-contact portion is formed in an end portion in an absorption axis direction of the polarizer.

In one embodiment of the present invention, the polarizing plate has formed therein a through-hole and the non-contact portion is formed in a peripheral edge portion, of the through-hole.

In one embodiment, of the present invention, the non-contact portion is formed in an outer edge portion of the polarizing plate.

In one embodiment of the present invention, the outer edge portion includes a site that forms a substantially V-shape that is convex inward in a plane direction.

According to another aspect of the present invention, there is provided an image display apparatus. The image display apparatus includes the polarizing plate with a pressure-sensitive adhesive layer.

According to still another aspect of the present invention, there is provided a method of bonding a polarizing plate. The method of bonding a polarizing plate includes: forming a pressure-sensitive adhesive layer on at least one surface of a polarizing plate including a polarizer and a protective film arranged on at least one side of the polarizer; and bonding the polarizing plate to an adherend through intermediation of the pressure-sensitive adhesive layer, wherein in the surface of the polarizing plate where the pressure-sensitive adhesive layer is formed, a non-contact portion that is out of contact with the pressure-sensitive adhesive layer is formed in an end portion of the polarizing plate.

According to still another aspect of the present invention, there is provided a method of producing a polarizing plate with a pressure-sensitive adhesive layer. The method of producing a polarizing plate with a pressure-sensitive adhesive layer includes in the following order: bonding, to a polarizing plate including a polarizer and a protective film arranged on at least one side of the polarizer, a pressure-sensitive adhesive film including a resin film and a pressure-sensitive adhesive layer arranged on one surface of the resin film, the pressure-sensitive adhesive film having formed therein a penetration hole penetrating the resin film and the pressure-sensitive adhesive layer integrally; and forming, at a position of the polarizing plate corresponding to the penetration hole of the pressure-sensitive adhesive film, a through-hole smaller than the penetration hole.

According to the present invention, durability can be imparted to a polarizing plate.

DETAILED DESCRIPTION OF THE PREFERRED EMBODIMENTS

Now, embodiments of the present invention are described. However, the present invention is not limited to these embodiments.

A. Polarizing Plate with Pressure-Sensitive Adhesive Layer

Figure 1:
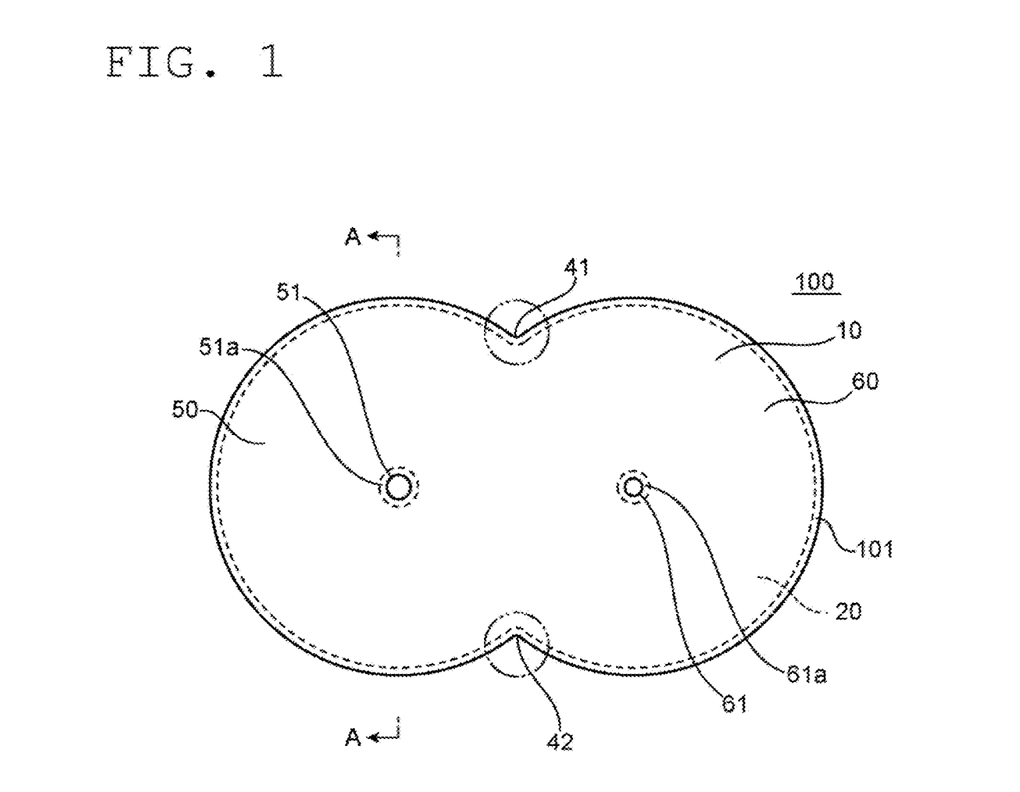
FIG. 1 is a view of a polarizing plate with a pressure-sensitive adhesive layer according to one embodiment of the present invention when viewed from above.
Figure 2:
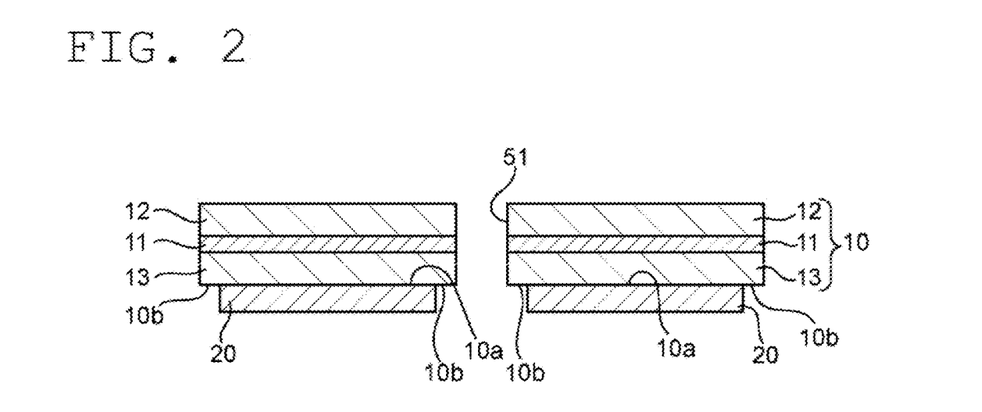
FIG. 2 is an A-A sectional view of the polarizing plate with a pressure-sensitive adhesive layer illustrated in FIG. 1.

FIG. 1 is a view of a polarizing plate with a pressure-sensitive adhesive layer according to one embodiment of the present invention when viewed from above, and FIG. 2 is an A-A sectional view of the polarizing plate with a pressure-sensitive adhesive layer illustrated in FIG. 1.

A polarizing plate 100 with a pressure-sensitive adhesive layer includes a polarizing plate 10 and a pressure-sensitive adhesive layer 20 formed on one surface (the lower surface in the illustrated example) 10a of the polarizing plate 10. The polarizing plate 10 is bonded to any other member (e.g., an optical member, such as a retardation film, a brightness enhancement film, or a liquid crystal cell) through intermediation of the pressure-sensitive adhesive layer 20. A separator is typically bonded to the surface of the pressure-sensitive adhesive layer 20 until the polarizing plate with a pressure-sensitive adhesive layer is put into practical use, though the separator is not shown.

The polarizing plate 100 with a pressure-sensitive adhesive layer is suitably used in the meter panel of an automobile. The polarizing plate 10 includes a first display portion 50 and a second display portion 60 that are continuously arranged, and through-holes 51 and 61 for fixing various meter needles are formed around the centers of the respective display portions. The diameter of each of the through-holes is, for example, from 0.5 mm to 100 mm. The outer edge of each of the display portions 50 and 60 is formed into an arc shape along the rotational direction of a meter needle.

The polarizing plate 10 includes a polarizer 11, a first protective film 12 arranged on one side of the polarizer 11, and a second protective film 13 arranged on the other side of the polarizer 11. The protective films 12 and 13 are each typically bonded to the surface of the polarizer 11 through intermediation of an adhesive layer, though the adhesive layer is not shown. Although the protective films are arranged on both sides of the polarizer in this illustrated example, a protective film may be arranged only on one side thereof. When a protective film is arranged only on one side of the polarizer, the pressure-sensitive adhesive layer may be formed on a polarizer surface, or may be formed on a protective film surface.

In the lower surface 10a of the polarizing plate 10, non-contact portions 10b, 10b that are out of contact with the pressure-sensitive adhesive layer 20 are formed. In the illustrated example, the non-contact portions are formed in an outer edge portion 101 of the polarizing plate 10, and peripheral edge portions 51a and 61a of the through-holes 51 and 61 of the polarizing plate 10. When, in the surface of the polarizing plate where the pressure-sensitive adhesive layer is formed, a non-contact portion where the pressure-sensitive adhesive layer is out of contact with the polarizing plate is formed in an end portion, the occurrence of a crack in the polarizing plate can be effectively suppressed. Specifically, the polarizing plate is bonded to any other member through intermediation of the pressure-sensitive adhesive layer, and when the polarizing plate is shrunk by a change in external environment, a stress may occur between the polarizing plate and the pressure-sensitive adhesive layer. When the portion out of contact with the pressure-sensitive adhesive layer is formed in the end portion of the polarizing plate, a site on which the stress concentrates can be shifted inward from the end portion of the polarizing plate that is liable to cause as the starting point of the crack. As a result, the occurrence of the crack in the polarizing plate is suppressed, and hence the polarizing plate can have excellent durability. Therefore, when a non-contact portion is formed in a site on which a stress is liable to concentrate, such as the peripheral edge of a through-hole or a site that forms a V-shape to be described later, the occurrence of the crack can be effectively suppressed.

When a through-hole is formed in the polarizing plate like the illustrated example, the position of the through-hole may be appropriately set in accordance with, for example, the applications of the polarizing plate. The crack is liable to occur from the peripheral edge of the through-hole serving as a starting point, and the tendency may be more remarkable as the position of the through-hole becomes more distant from the outer edge of the polarizing plate. As a result, as the position of the through-hole becomes more distant from the outer edge of the polarizing plate (e.g., its distance from the outer edge of the polarizing plate is 15 mm or more), the effect exhibited by the formation of the non-contact portion can be more significantly obtained.

In the outer edge portion 101, the non-contact portion is preferably formed in at least a boundary portion 41 or 42 between the respective display portions. Specifically, the non-contact portion is preferably formed in a site whose outer edge forms a V-shape (including an R-shape) that is convex inward in the plane direction. This is because the site whose outer edge forms a V-shape that is convex inward in the plane direction is liable to cause as the starting point of the crack as in the peripheral edge of the through-hole.

The non-contact portion is preferably formed in an end portion in the absorption axis direction of the polarizer. The crack tends to occur along the absorption axis direction of the polarizer, and hence the formation of the non-contact portion in the end portion in the absorption axis direction can effectively suppress the occurrence of the crack.

The non-contact portion is preferably, formed at a position distant from, an end side of the polarizing plate by 10 μm or more inward in the plane direction, is more preferably formed at a position distant therefrom by 100 μm or more, and is particularly preferably formed at a position distant therefrom by 300 μm or more. This is because the non-contact portion can be secured even when, for example, bonding displacement occurs. Meanwhile, the non-contact portion is preferably formed at a position distant from the end side of the polarizing plate by 2,000 μm or less inward in the plane direction, and is more preferably formed at a position distant therefrom by 1,000 μm or less from, for example, the viewpoint that the bonding of the polarizing plate to any other member is performed with reliability, and the viewpoint that an effective region of the polarizing plate is secured. It is preferred that the non-contact portion be continuously formed from the end side of the polarizing plate to the position.

The polarizing plate with a pressure-sensitive adhesive layer of the present invention is not limited to the construction of the illustrated example and may be appropriately changed. For example, the shape of the polarizing plate, the presence or absence of the through-holes, the shapes and sizes of the through-holes, the number and formation positions of the through-holes, and the shape of the non-contact portion may appropriately be changed. In addition, although the pressure-sensitive adhesive layer is formed only on one surface of the polarizing plate in the illustrated example, another pressure-sensitive adhesive layer may be formed on the other surface of the polarizing plate. In this case, the non-contact portion may be formed also on the other surface. More specifically, when pressure-sensitive adhesive layers are formed on both surfaces of the polarizing plate, the non-contact portion may be formed only on the upper surface thereof, the non-contact portion may be formed only on the lower surface thereof, or the non-contact portions may be formed on both surfaces thereof. In addition, for example, when the polarizing plate is a so-called one-side-protected polarizing plate having a protective film only on one surface of a polarizer, the following construction is preferred: a non-contact portion is formed only in the pressure-sensitive adhesive layer arranged on a protective film side, and a non-contact portion is not arranged in the pressure-sensitive adhesive layer arranged on a polarizer side. The construction can not only suppress a crack occurring in the polarizing plate but also suppress the deterioration of the polarizer.

A-1. Polarizer

The polarizer typically includes a resin film containing a dichromatic substance. Examples of the dichromatic substance include iodine and an organic dye. The substances may be used alone or in combination. Of those, iodine is preferably used.

Any appropriate resin may be used as a resin for forming the resin film. A hydrophilic resin (e.g., a polyvinyl alcohol (PVA)-based resin) is preferably used as the resin. Examples of the PVA-based resin include polyvinyl alcohol and an ethylene-vinyl alcohol copolymer. The polyvinyl alcohol is obtained by saponifying polyvinyl acetate. The ethylene-vinyl alcohol copolymer is obtained by saponifying an ethylene-vinyl acetate copolymer. The saponification degree of the PVA-based resin is typically from 85 mol % to 100 mol %, preferably 95.0 mol % or more, more preferably 99.0 mol % or more, particularly preferably 99.93 mol % or more. The saponification degree may be determined in conformity with JIS K 6726-1994. The use of the PVA-based resin having such saponification degree can provide a polarizer excellent in durability.

The average polymerization degree of the PVA-based resin may appropriately be selected depending on purposes. The average polymerization degree is typically from 1,000 to 10,000, preferably from 1,200 to 6,000, more preferably from 2,000 to 5,000. The average polymerization degree may be determined in conformity with JIS K 6726-1994.

The polarizer preferably shows absorption dichroism in the wavelength range of from 380 nm to 780 nm. The single axis transmittance (Ts) of the polarizer is preferably 40% or more, more, preferably 41% or more, still more preferably 42% or more, particularly preferably 43% or more. A theoretical upper limit for the single axis transmittance is 50%, and a practical upper limit therefor is 46%. In addition, the single axis transmittance (Ts) is a Y value measured with the two-degree field of view (C light source) of JIS Z 8701 and subjected to visibility correction, and may be measured with, for example, a spectrophotometer (manufactured by JASCO Corporation, V7100). The polarization degree of the polarizer is preferably 99.8% or more, more preferably 93.9% or more, still more preferably 95.95% or more.

The thickness of the polarizer may be set to any appropriate value. The thickness is typically from 1 μm to 80 μm, preferably from 3 μm to 40 μm.

The polarizer may be typically obtained by subjecting the resin film to treatments, such as a swelling treatment, a stretching treatment, a dyeing treatment with the dichromatic substance, a cross-linking treatment, a washing treatment, and a drying treatment. The number of times of each of the treatments, the order in which the treatments are performed, the timings of the treatments, and the like may appropriately be set. When the resin film is subjected to each of the treatments, the film may be a resin layer formed on a base material.

The cross-linking treatment is performed by, for example, bringing a boric acid solution (e.g., an aqueous solution of boric acid) into contact with the resin film. In addition, when a wet stretching system is adopted in the stretching treatment, the stretching is preferably performed while a boric acid solution is brought into contact with the resin film. In ordinary cases, the resin film is uniaxially stretched at from 3 times to 7 times from the viewpoint that excellent polarization characteristics are obtained. A stretching direction in the stretching treatment may correspond to the absorption axis direction of the polarizer to be obtained. In one embodiment, while an elongated resin film is conveyed in its lengthwise direction, the film is stretched in the conveying direction (machine direction). In this case, the absorption axis direction of the polarizer to be obtained may be the lengthwise direction (MD).

A-2. Protective Film

As the formation materials of the protective film, there are given, for example, a cellulose-based resin, such as diacetyl cellulose or triacetyl cellulose (TAC), a (meth)acrylic resin, a cycloolefin-based resin, an olefin-based resin, such as polypropylene, an ester-based resin, such as a polyethylene terephthalate-based resin, a polyamide-based resin, a polycarbonate-based resin, and copolymer resins thereof. The term "(meth) acrylic resin" refers to an acrylic resin and/or a methacrylic resin.

The thickness of the protective film is preferably from 10 μm to 200 μm. A surface-treated layer may be formed on one side of the protective film (side on which the polarizer is not arranged). Specifically, the side may be subjected to a hard coat treatment, an antireflection treatment, or a treatment intended for diffusion or anti-glaring. In addition, the protective film may function as a retardation film. When the protective films are arranged on both sides of the polarizer like the illustrated example, the constructions (including a formation material and a thickness) of both the films may be identical to each other, or may be different from each other.

The protective film is typically bonded to the surface of the polarizer through intermediation of an adhesive layer. Any appropriate adhesive is used as an adhesive to be used in the bonding of the protective film. For example, an aqueous adhesive, a solvent-based adhesive, or an active energy ray-curable adhesive is used. An adhesive containing a PVA-based resin is preferably used as the aqueous adhesive.

A-3. Pressure-Sensitive Adhesive Layer

The pressure-sensitive adhesive layer may be formed of any appropriate pressure-sensitive adhesive. Specific examples of the pressure-sensitive adhesive include a rubber-based pressure-sensitive adhesive, an acrylic pressure-sensitive adhesive, a silicone-based pressure-sensitive adhesive, a urethane-based pressure-sensitive adhesive, a vinyl alkyl ether-based pressure-sensitive adhesive, a polyvinyl alcohol-based pressure-sensitive adhesive, a polyvinylpyrrolidone-based pressure-sensitive adhesive, a polyacrylamide-based pressure-sensitive adhesive, and a cellulose-based pressure-sensitive adhesive. Of those, an acrylic pressure-sensitive adhesive is preferably used.

The acrylic pressure-sensitive adhesive typically contains as a base polymer an acrylic polymer having a monomer unit of a (meth)acrylic acid alkyl ester as a main skeleton. The "(meth) acrylic acid alkyl ester" as used herein refers to an acrylic acid alkyl ester and/or a methacrylic acid alkyl ester.

An alkyl group of the (meth) acrylic acid alkyl ester may be linear or branched. The number of carbon atoms of the alkyl group is, for example, from 1 to 20. Specific examples of the (meth) acrylic acid alkyl ester include methyl (meth) acrylate, ethyl (meth)acrylate, propyl (meth)acrylate, butyl (meth)acrylate, 2-ethylhexyl (meth)acrylate, isooctyl (meth)

acrylate, isononyl (meth)acrylate, isomyristyl (meth)acrylate, and lauryl (meth)acrylate. They may be used alone or in combination. The average number of carbon atoms in those alkyl groups is preferably from 3 to 9.

For example, a copolymerizable monomer may be introduced into the acrylic polymer by copolymerization from the viewpoint of improving an adhesive property, heat resistance, and the like. Specific examples of the copolymerizable monomer include: hydroxyl group-containing monomers, such as 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate, and (4-hydroxymethylcyclohexyl)-methyl acrylate; carboxyl group-containing monomers, such as (meth) acrylic acid, carboxyethyl (meth)acrylate, carboxypentyl (meth)acrylate, itaconic acid, maleic acid, fumaric acid, and crotonic acid; acid anhydride group-containing monomers, such as maleic anhydride and itaconic anhydride; caprolactone adducts of acrylic acid; sulfonic acid group-containing monomers, such as styrenesulfonic acid and allyl sulfonic acid, 2-(meth)acrylamido-2-methylpropanesulfonic acid, (meth)acrylamidopropanesulfonic acid, sulfopropyl (meth)acrylate, and (meth)acryloyloxynaphthalenesulfonic acid; and phosphoric acid group-containing monomers, such as 2-hydroxyethylacryloyl phosphate.

Other specific examples of the copolymerizable monomer include: (N-substituted) amide-based monomers, such as (meth) acrylamide, N,N-dimethyl (meth) acrylamide, N-butyl(meth)acrylamide, N-methylol(meth)acrylamide, and N-methylolpropane(meth)acrylamide; alkylaminoalkyl (meth)acrylate-based monomers, such as aminoethyl (meth)acrylate, N,N-dimethylaminoethyl (meth)acrylate, and t-butylaminoethyl (meth)acrylate; alkoxyalkyl (meth)acrylate-based monomers, such as methoxyethyl (meth)acrylate and ethoxyethyl (meth)acrylate; succinimide-based monomers, such as N-(meth)acryloyloxymethylenesuccinimide, N-(meth)acryloyl-6-oxyhexamethylenesuccinimide, N-(meth) acryloyl-8-oxyoctamethylenesuccinimide, and N-acryloylmorpholine; maleimide-based monomers, such as N-cyclohexylmaleimide, N-isopropylmaleimide, N-laurylmaleimide, and N-phenylmaleimide; and itaconimide-based monomers, such as N-methylitaconimide, N-ethylitaconimide, N-butylitaconimide, N-octylitaconimide, N-2-ethylhexylitaconimide, N-cyclohexylitaconimide, and N-laurylitaconimide.

Still other specific examples of the copolymerizable monomer include: vinyl-based monomers, such as vinyl acetate, vinyl propionate, N-vinylpyrrolidone, methylvinylpyrrolidone, vinyl pyridine, vinylpiperidone, vinylpyrimidine, vinylpiperazine, vinylpyrazine, vinylpyrrole, vinylimidazole, vinyloxazole, vinylmorpholine, N-vinylcarboxylic acid amides, styrene, α-methylstyrene, and N-vinylcaprolactam; cyanoacrylate-based monomers, such as acrylonitrile and methacrylonitrile; epoxy group-containing acrylic monomers, such as glycidyl (meth)acrylate; glycol-based acrylic ester monomers, such as polyethylene glycol (meth)acrylate, polypropylene glycol (meth)acrylate, methoxyethylene glycol (meth)acrylate, and methoxypolypropylene glycol (meth)acrylate; and acrylic acid ester-based monomers, such as tetrahydrofurfuryl (meth)acrylate, a fluorinated (meth)acrylate, a silicone (meth)acrylate, and 2-methoxyethyl acrylate.

Of the copolymerizable monomers, a hydroxyl group-containing monomer or a carboxyl group-containing monomer is preferably used from the viewpoints of an adhesive property and durability. The number of carbon atoms of the alkyl group of a hydroxyalkyl in the hydroxyl group-containing monomer is preferably 4 or more. This is because such monomer can be excellent in, for example, reactivity with an isocyanate-based compound to be described later. When such hydroxyl group-containing monomer is used, an ester whose alkyl group has a number of carbon atoms equal to or less than the number of carbon atoms of the alkyl group of the hydroxyalkyl is preferably used as the (meth)acrylic acid alkyl ester.

The ratio of the copolymerizable monomer in the acrylic polymer is, for example, from 0 wt % to 20 wt %. When a hydroxyl group-containing monomer is used as the copolymerizable monomer, the ratio is preferably from 0.01 wt % to 10 wt %, more, preferably from 0.01 wt % to 5 wt %, still more preferably from 0.03 wt % to 3 wt %, particularly preferably from 0.05 wt % to 1 wt %. When a carboxyl group-containing monomer is used, the ratio is preferably from 0.1 wt % to 10 wt %, more preferably from 0.2 wt % to 8 wt %, particularly preferably from 0.6 wt % to 6 wt %.

The weight-average molecular weight of the acrylic polymer is, for example, from 300,000 to 2,500,000. The acrylic polymer may be produced by any appropriate method. For example, a radical polymerization method, such as a bulk polymerization method, a solution polymerization method, or a suspension polymerization method, is adopted. Of those, a solution polymerization method is preferably adopted. In the radical polymerization method, an azo- or peroxide-based polymerization initiator is typically used. A reaction temperature is, for example, from 50° C. to 80° C. A reaction time is, for example, from 1 hour to 8 hours. A solvent to be used in the solution polymerization method is, for example, ethyl acetate or toluene. A solution concentration is set to, for example, from 20 wt % to 80 wt %.

The pressure-sensitive adhesive preferably contains a cross-linking agent. For example, an epoxy-based cross-linking agent, an isocyanate-based cross-linking agent, an imine-based cross-linking agent, or a peroxide-based cross-linking agent is used as the cross-linking agent. Of those, an isocyanate-based cross-linking agent is preferred. The compounding amount of the cross-linking agent (solid content) is, for example, from 0.001 part by weight to 20 parts by weight with respect to 100 parts by weight of the base polymer (solid content). When the isocyanate-based cross-linking agent is used, its compounding amount is preferably from 0.001 part by weight to 2 parts by weight, more preferably from 0.01 part by weight to 1.5 parts by weight with respect to 100 parts by weight of the base polymer (solid content). In addition, the pressure-sensitive adhesive may contain any other component, such as a tackifier, a plasticizer, a filler, a pigment, a colorant, a filler, an antioxidant, a UV absorber, or a silane coupling agent.

The thickness of the pressure-sensitive adhesive layer is preferably from 2 μm to 150 μm, more preferably from 2 μm to 100 μm, particularly preferably from 5 μm to 50 μm.

B. Production Method

The polarizing plate may be formed into a desired shape. Specifically, a method of forming the polarizing place into the desired shape is typically, for example, a method involving cutting (punching) the polarizing plate. The cutting may be performed before the formation of the pressure-sensitive adhesive layer on the polarizing plate, or may be performed after the formation of the pressure-sensitive adhesive layer on the polarizing plate. Any appropriate method may be adopted as a cutting (punching) method. For example, a method involving irradiating the laminate with laser light or a method involving using a cutting blade (punching die), such as a Thomson blade or a pinnacle blade, is given. The laser light irradiation provides a smooth cut surface and can suppress the occurrence of the starting point of a crack (initial crack), and hence can contribute to a further improvement in durability.

Any appropriate laser may be adopted as the laser as long as the polarizing plate can be cut. A laser that can emit light having a wavelength in the range of from 150 nm to 11 µm is preferably used. Specific examples thereof include a gas laser, such as a $CO_2$ laser, a solid laser, such as an YAG laser, and a semiconductor laser. Of those, a $CO_2$ laser is preferably used.

A condition for the laser light irradiation may be set to any appropriate condition depending on, for example, the laser to be used. When the $CO_2$ laser is used, an output condition is preferably from 10 W to 1,000 W, more preferably from 100 W to 400 W.

Any appropriate method may be adopted as a method of forming the pressure-sensitive adhesive layer. Specifically, for example, a method involving applying the pressure-sensitive adhesive to the polarizing plate so that a desired shape may be obtained, or a method involving separately forming a pressure-sensitive adhesive layer having a desired shape on a substrate (e.g., a separator), and bonding the resultant to the polarizing plate is adopted. At the time of the bonding, the resultant is preferably bonded without the application of any tension to the polarizing plate.

In one embodiment, a polarizing plate with a pressure-sensitive adhesive layer having a through-hole is produced by a method including in the following order: bonding a pressure-sensitive adhesive film having a penetration hole to a polarizing plate; and forming, at the position of the polarizing plate corresponding to the penetration hole of the pressure-sensitive adhesive film, a through-hole smaller than the penetration hole. According to such method, the non-contact portion can be formed with high accuracy and efficiently.

The pressure-sensitive adhesive film having a penetration hole is typically produced by: preparing a laminate including a resin film and a pressure-sensitive adhesive layer arranged on one surface of the resin film; and forming a penetration hole in the laminate.

The resin film is preferably, for example, a film having a high modulus of elasticity from the viewpoint of preventing the deformation of a penetration hole at the time of conveyance and/or at the time of bonding. Examples of a formation material for the resin film include: ester-based resins, such as a polyethylene terephthalate-based resin; cycloolefin-based resins, such as a norbornene-based resin; olefin-based resins, such as polypropylene; polyamide-based resins; polycarbonate-based resins; and copolymer resins thereof. Of those, an ester-based resin (especially a polyethylene terephthalate-based resin) is preferred. Such material has the following advantages: the material has a sufficiently high modulus of elasticity; and even when tension is applied at the time of the conveyance and/or at the time of the bonding, the deformation of a penetration hole hardly occurs.

The modulus of elasticity of the resin film is preferably from 2.2 $kN/mm^2$ to 4.8 $kN/mm^2$. In the case where the modulus of elasticity of the resin film falls within such range, the resin film has an advantage in that even when tension is applied at the time of the conveyance and/or at the time of the bonding, the deformation of a penetration hole hardly occurs. The modulus of elasticity is measured in conformity with JIS K 6781.

The tensile elongation of the resin film is preferably from 90% to 170%. When the tensile elongation of the resin film falls within such range, the resin film has, for example, an advantage in that the resin film hardly ruptures during its conveyance. The tensile elongation is measured in conformity with JIS K 6781.

The thickness of the resin film is typically from 20 µm to 250 µm, preferably from 30 µm to 150 µm. The resin film can function as, for example, a separator for the polarizing plate with a pressure-sensitive adhesive layer to be obtained. In this case, the surface of the resin film where the pressure-sensitive adhesive layer is arranged may be coated with a releasing agent, such as a silicone-based releasing agent, a fluorine-based releasing agent, or a long-chain alkyl acrylate-based releasing agent, in advance.

The pressure-sensitive adhesive layer is arranged on the resin film by any appropriate method. The method is, for example, a method involving applying the pressure-sensitive adhesive onto the resin film and drying the pressure-sensitive adhesive. A method for the application is, for example, a roll coating method, such as reverse coating or gravure coating, a spin coating method, a screen coating method, a fountain coating method, a dipping method, or a spray method.

Next, a penetration hole is formed in the laminate of the resin film and the pressure-sensitive adhesive layer. The penetration hole penetrates the resin film and the pressure-sensitive adhesive layer integrally. The penetration hole can be formed by, for example, the cutting of the laminate or the removal of a predetermined portion of the laminate (e.g., laser ablation or chemical dissolution). A method for the cutting is, for example, a method involving mechanically cutting the laminate with, for example, a cutting blade (punching die), such as a Thomson blade or a pinnacle blade, or a water jet, or a method involving irradiating the laminate with laser light to cut the laminate.

After the pressure-sensitive adhesive film having the penetration hole has been bonded to the polarizing plate, a through-hole is formed at the position of the polarizing plate corresponding to the penetration hole of the pressure-sensitive adhesive film. The through-hole is formed so that a desired non-contact portion may be formed. A method of forming the through-hole (method of punching the polarizing plate) is as described above.

Figure 3:
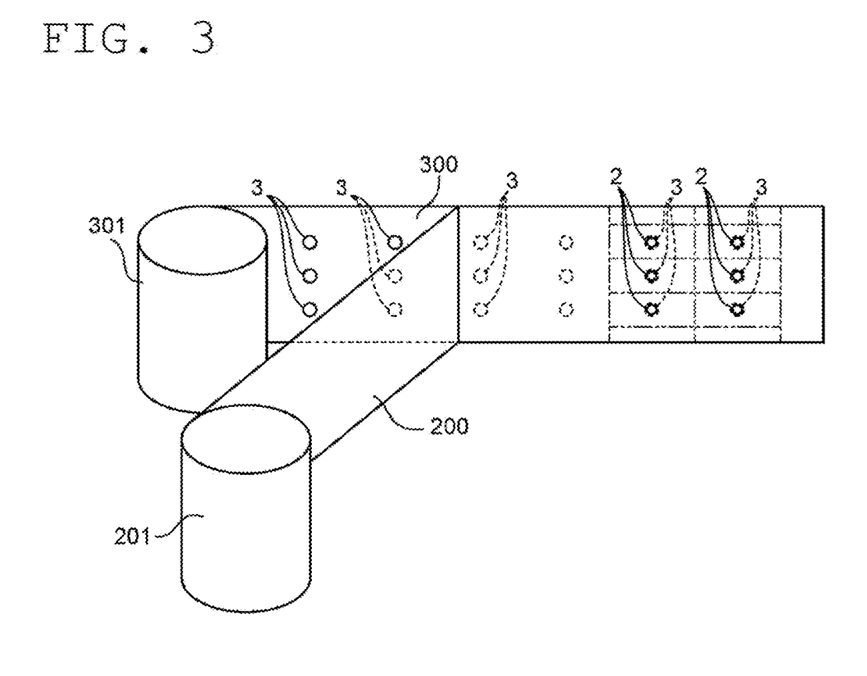
FIG. 3 is a schematic view for illustrating a specific example of bonding between a polarizing plate and a pressure-sensitive adhesive film.

FIG. 3 is a schematic view for illustrating a specific example of the bonding between the polarizing plate and the pressure-sensitive adhesive film. In the illustrated example, a pressure-sensitive adhesive film 300 that is elongated and has penetration holes is bonded to one surface of an elongated polarizing plate 200 by a roll-to-roll process. Herein, the term "roll-to-roll" means that films wound in roll shapes are laminated with their lengthwise directions aligned with each other while the films are conveyed.

In the illustrated example, penetration holes 3, 3, 3 . . . are formed while the pressure-sensitive adhesive film 300 unwound from a pressure-sensitive, adhesive film roll 301 is conveyed in its lengthwise direction, followed by the bonding of the pressure-sensitive adhesive film 300 to the polarizing plate 200. The arrangement pattern of the penetration holes is appropriately set in accordance with a desired polarizing plate. For example, the penetration holes are arranged in the lengthwise direction of the pressure-sensitive adhesive film and/or the widthwise direction thereof at a predetermined interval as illustrated in the figure.

After the pressure-sensitive adhesive film 300 has been bonded to the polarizing plate 200, through-holes 2 are formed at the positions of the polarizing plate 200 corresponding to the penetration holes 3 of the pressure-sensitive adhesive film 300 by punching. In the illustrated example, the circular through-holes 2 that are one size smaller than the circular penetration holes 3 of the pressure-sensitive adhesive film 300 are formed so that the centers of the through-holes 2 and the penetration holes 3 may overlap each other. Typically, after the through-holes 2 have been formed in the polarizing plate 200, a laminated film of the polarizing plate 200 and the pressure-sensitive adhesive film 300 is cut into a desired shape (e.g., as represented by two-dot chain lines in the figure).

C. Image Display Apparatus

An image display apparatus of the present invention includes the polarizing plate with a pressure-sensitive adhesive layer. When the image display apparatus is a liquid crystal display apparatus, the polarizing plate with a pressure-sensitive adhesive layer is bonded to, for example, a liquid crystal cell.

D. Method of Bonding Polarizing Plate

A method of bonding a polarizing plate of the present invention includes bonding the polarizing plate with a pressure-sensitive adhesive layer to an adherend (e.g., an optical member, such as a retardation film, a brightness enhancement film, or a liquid crystal cell). Specifically, the method includes forming a pressure-sensitive adhesive layer on at least one surface of the polarizing plate, and bonding the polarizing plate to the adherend through intermediation of the pressure-sensitive adhesive layer, and in the surface of the polarizing plate where the pressure-sensitive adhesive layer is formed, a non-contact portion that is out of contact with the pressure-sensitive adhesive layer is formed in an end portion of the polarizing plate.

Now, the present invention is specifically described by way of Examples. However, the present invention is not limited to these Examples.

Example 1

(Production of Polarizing Plate)

A film (thickness: 28 μm) obtained by incorporating iodine into an elongated PVA-based resin film and uniaxially stretching the film in its lengthwise direction (MD) was used as a polarizer.

A PVA-based adhesive was applied to one side of the polarizer so that its thickness after drying became 100 nm, and an elongated TAC film having a thickness of 40 μm was bonded to the polarizer so that their lengthwise directions were aligned with each other.

Subsequently, a PVA-based adhesive was applied to the other side of the polarizer so that its thickness after drying became 100 nm, and an elongated acrylic film having a thickness of 30 μm was bonded to the polarizer so that their lengthwise directions were aligned with each other.

Thus, a polarizing plate sheet having a construction "TAC film/polarizer/acrylic film" was obtained.

The resultant polarizing plate sheet was cut with a $CO_2$ laser (wavelength: 9.35 μm, output: 150 W) to provide a polarizing plate of a size measuring 112 mm by 42 mm, the polarizing plate having a through-hole having a diameter of 2 mm formed at its center. The cutting was performed so that the long side of the polarizing plate to be obtained corresponded to the transmission axis direction of the polarizer (the short side thereof corresponded to the absorption axis direction of the polarizer).

A separator of a size measuring 108 mm by 38 mm, the separator having a through-hole having a diameter of 4 mm formed at its center, was prepared, and an acrylic pressure-sensitive adhesive layer having a thickness of 20 μm was formed thereon. The resultant was bonded to the polarizing plate. Thus, a polarizing plate with a pressure-sensitive adhesive layer was obtained. At the time of the bonding, the resultant and the polarizing plate were bonded to each other so that their centers overlapped each other and their long side directions were aligned with each other.

Example 2

A separator of a size measuring 108 mm by 38 mm, the separator having a through-hole having a diameter of 4 mm formed at its center, was prepared, and an acrylic pressure-sensitive adhesive layer having a thickness of 150 μm was formed thereon. The resultant was bonded to the surface of the polarizing plate with a pressure-sensitive adhesive layer produced in Example 1 where no pressure-sensitive adhesive was arranged. Thus, a polarizing plate with a pressure-sensitive adhesive layer having the pressure-sensitive adhesive layers on both of its surfaces and having non-contact portions formed en tooth the surfaces was obtained. At the time of the bonding, the resultant and the polarizing plate with a pressure-sensitive adhesive layer produced in Example 1 were bonded to each other so that their centers overlapped each other and their long side directions were aligned with each other.

Example 3

A polarizing plate of a size measuring 112 mm by 42 m, the polarizing plate having a through-hole having a diameter of 2 mm formed at its center, was obtained in the same manner as in Example 1. Next, a separator of a size measuring 112 mm by 42 mm, the separator having a through-hole having a diameter of 2 mm formed at its center, was prepared, and an acrylic pressure-sensitive adhesive layer having a thickness of 20 μm was formed thereon. The resultant was bonded to one surface of the polarizing plate. Further, a separator of a size measuring 108 mm by 38 mm, the separator having a through-hole having a diameter of 4 mm formed at its center, was prepared, and an acrylic pressure-sensitive adhesive layer having a thickness of 150 μm was formed thereon, followed by the bonding of the resultant to the other surface of the polarizing plate. Thus, a polarizing plate with a pressure-sensitive adhesive layer having the pressure-sensitive adhesive layers on both of its surfaces and having a non-contact portion formed only on one of the surfaces was obtained.

Comparative Example 1

A polarizing plate with a pressure-sensitive adhesive layer was obtained in the same manner as in Example 1 except that a separator of a size measuring 112 mm by 42 mm, the separator having a through-hole having a diameter of 2 mm formed at its center, was used.

The durability of each of the resultant polarizing plates with pressure-sensitive adhesive layers was evaluated by a heat cycle test (also referred to as heat shock (HS) test). Specifically, with regard to each of Example 1 and Comparative Example 1, a test sample was obtained by bonding, to a glass plate, the polarizing plate with a pressure-sensitive adhesive layer from which the separator had been peeled. With regard to each of Examples 2 and 3, a test sample was obtained by peeling the separators on both the surfaces and bonding a glass plate to each of the peeled surfaces. Each of the resultant test samples was left to stand under an atmosphere at −40° C. for 30 minutes and then left to stand under an atmosphere at 85° C. for 30 minutes. The foregoing operation was defined as one cycle and the cycle was repeated 100 times. After that, whether or not a crack occurred in the polarizing plate was observed.

Figure 4A:
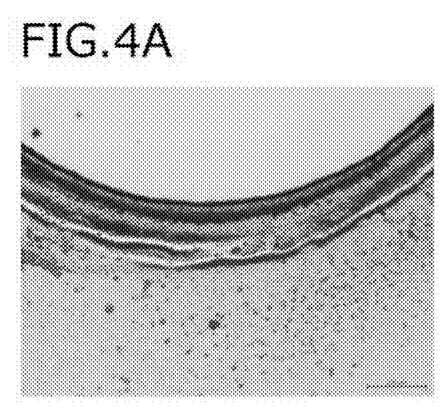
FIG. 4A is a photograph for showing the periphery of a through-hole of the polarizing plate of Example 1 after a heat cycle test.
Figure 4B:
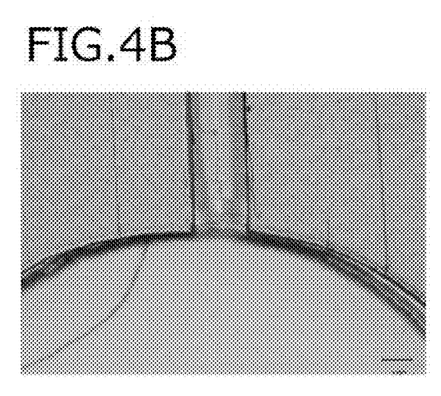
FIG. 4B is a photograph for showing the periphery of a through-hole of the polarizing plate of Comparative Example 1 after a heat cycle test.

FIGS. 4A and 4B are photographs obtained by observing the peripheries of the through-holes of the polarizing plates of Example 1 and Comparative Example 1 after the HS tests with an optical microscope (manufactured by Olympus Corporation, MX61, magnification: 5). While a crack that can be clearly viewed with the eyes is observed in Comparative Example 1, the occurrence of a crack (including a small crack) is not observed in Example 1.

The polarizing plate with a pressure-sensitive adhesive layer of the present invention can be suitably used not only in an image display apparatus (a liquid crystal display apparatus or an organic EL device) of a rectangular shape but also in, for example, an image display portion of a particular shape typified by the meter display portion of an automobile or a smart watch.

Many other modifications will be apparent to and foe readily practiced by those skilled in the art without departing from the scope and spirit of the invention. It should therefore be understood that the scope of the appended claims is not intended to be limited by the details of the description but should rather be broadly construed.

The invention claimed is:

1. A polarizing plate with a pressure-sensitive adhesive layer, comprising:
   a polarizing plate including a polarizer and a protective film arranged on at least one side of the polarizer; and
   a pressure-sensitive adhesive layer formed on at least one surface of the polarizing plate,
   wherein in the surface of the polarizing plate where the pressure-sensitive adhesive layer is formed, a non-contact portion that is out of contact with the pressure-sensitive adhesive layer is formed in an end portion of the polarizing plate.

2. The polarizing plate with a pressure-sensitive adhesive layer according to claim 1, wherein the non-contact portion is formed at a position distant from an end side of the polarizing plate by 10 μm or more inward in a plane direction.

3. The polarizing plate with a pressure-sensitive adhesive layer according to claim 1, wherein the non-contact portion is formed in an end portion in an absorption axis direction of the polarizer.

4. The polarizing plate with a pressure-sensitive adhesive layer according to claim 1, wherein the polarizing plate has formed therein a through-hole and the non-contact portion is formed in a peripheral edge portion of the through-hole.

5. The polarizing plate with a pressure-sensitive adhesive layer according to claim 1, wherein the non-contact portion is formed in an outer edge portion of the polarizing plate.

6. The polarizing plate with a pressure-sensitive adhesive layer according to claim 5, wherein the outer edge portion includes a site that forms a substantially V-shape that is convex inward in a plane direction.

7. An image display apparatus, comprising the polarizing plate with a pressure-sensitive adhesive layer of claim 1.

8. A method of bonding a polarizing plate, comprising:
   forming a pressure-sensitive adhesive layer on at least one surface of a polarizing plate including a polarizer and a protective film arranged on at least one side of the polarizer; and
   bonding the polarizing plate to an adherend through intermediation of the pressure-sensitive adhesive layer,
   wherein in the surface of the polarizing plate where the pressure-sensitive adhesive layer is formed, a non-contact portion that is out of contact with the pressure-sensitive adhesive layer is formed in an end portion of the polarizing plate.

9. A method of producing a polarizing plate with a pressure-sensitive adhesive layer, comprising in the following order:
   bonding, to a polarizing plate including a polarizer and a protective film arranged on at least one side of the polarizer, a press lire-sensitive adhesive film including a resin film and a pressure-sensitive adhesive layer arranged on one surface of the resin film, the pressure-sensitive adhesive film having formed therein a penetration hole penetrating the resin film and the pressure-sensitive adhesive layer integrally; and
   forming, at a position of the polarizing plate corresponding to the penetration hole of the pressure-sensitive adhesive film, a through-hole smaller than the penetration hole.

* * * * *

UNITED STATES PATENT AND TRADEMARK OFFICE
CERTIFICATE OF CORRECTION

PATENT NO. : 10,139,671 B2
APPLICATION NO. : 15/341101
DATED : November 27, 2018
INVENTOR(S) : Katsunori Takada et al.

Page 1 of 1

It is certified that error appears in the above-identified patent and that said Letters Patent is hereby corrected as shown below:

In the Claims

Column 14 Line 34 in Claim 9:
Change:
"a press lire sensitive adhesive film"
To be:
--a pressure sensitive adhesive film--

Signed and Sealed this
Ninth Day of April, 2019

Andrei Iancu
*Director of the United States Patent and Trademark Office*